US010832416B2

(12) United States Patent
Tao et al.

(10) Patent No.: US 10,832,416 B2
(45) Date of Patent: Nov. 10, 2020

(54) CROWD FLOW RATE ESTIMATION

(71) Applicant: International Business Machines Corporation, Armonk, NY (US)

(72) Inventors: Shen Ming Tao, Beijing (CN); Dan Zhang, Beijing (CN); Hong Bing Zhang, Beijing (CN); Xue Ping Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/137,692

(22) Filed: Sep. 21, 2018

(65) Prior Publication Data

US 2020/0098112 A1 Mar. 26, 2020

(51) Int. Cl.
*G06T 7/20* (2017.01)

(52) U.S. Cl.
CPC ...... *G06T 7/20* (2013.01); *G06T 2207/30242* (2013.01)

(58) Field of Classification Search
CPC ........................ G06T 2207/30242; G06T 7/20
See application file for complete search history.

(56) References Cited

U.S. PATENT DOCUMENTS

| | | | |
|---|---|---|---|
| 9,158,971 B2 | 10/2015 | Gaidon et al. | |
| 9,495,600 B2 | 11/2016 | Heu et al. | |
| 2010/0021009 A1 * | 1/2010 | Yao | G06T 7/246 382/103 |
| 2016/0283800 A1 | 9/2016 | Ghanem et al. | |

FOREIGN PATENT DOCUMENTS

| | | | |
|---|---|---|---|
| CN | 102324016 | A | 1/2012 |
| CN | 105160313 | A | 12/2015 |
| CN | 106778502 | A | 5/2017 |
| CN | 106960195 | A | 7/2017 |
| CN | 106997459 | A | 8/2017 |
| CN | 107103279 | A | 8/2017 |
| WO | 2011097795 | A1 | 8/2011 |

OTHER PUBLICATIONS

Ma, Zheng, and Antoni B. Chan. "Crossing the line: Crowd counting by integer programming with local features." Proceedings of the IEEE Conference on Computer Vision and Pattern Recognition. 2013. (Year: 2013).*

Zhang et al., "Cross-scene Crowd Counting via Deep Convolutional Neural Networks", CVPR2015, IEEE Xplore, Jun. 2015, 9 pgs.

* cited by examiner

*Primary Examiner* — Nirav G Patel
(74) *Attorney, Agent, or Firm* — Scott S. Dobson; Maxine L. Barasch; Keohane & D'Alessandro, PLLC

(57) ABSTRACT

Disclosed embodiments provide techniques for estimating crowd flow rate. Video frames are obtained from a crowd scene. Groups of consecutive video frames form a time window. Crowd flow rate through the field of view of the camera is analyzed by estimating a total number of people contained within at least one frame of a time window. A subset of the people within the frame are identified as a group of tracker candidates. The tracker candidates are monitored throughout the time window, and the time when the tracker candidates exit the field of view of the camera is used to estimate a crowd flow rate for the number of people passing through the field of view of the camera in a given time interval. Thus, disclosed embodiments can improve the technical field of crowd flow rate estimation.

18 Claims, 12 Drawing Sheets

CROWD FLOW RATE ESTIMATION

FIELD

Embodiments of the invention relate to crowd flow rate estimation and, in particular, crowd flow rate estimation for adjustment of crowd flow control hardware.

BACKGROUND

Public parks, shopping centers, event venues, theme parks, and other public attractions may be crowded with people at times. The crowd may be moving in one direction or another, or the people within it may be moving at random. The rate of flow of the crowd is important for crowd management, policing, infrastructure management, marketing opportunities, etc. There exists a need for improved systems and methods for crowd flow rate estimation.

SUMMARY

In one embodiment, there is provided a computer-implemented method for crowd flow rate estimation, comprising: obtaining a plurality of video frames of a crowd scene; estimating a total number of people contained within at least one frame of the plurality of video frames; determining a subset of the total number of people as a group of tracker candidates, wherein the group of tracker candidates are located near a first end of a first video frame from the plurality of video frames; monitoring movement of the group of tracker candidates throughout the plurality of video frames; and in response to the group of tracker candidates reaching a second end of a second video frame from the plurality of video frames, computing an estimated crowd flow rate for the total number of people.

In another embodiment, there is provided an electronic communication device comprising: a processor; a memory coupled to the processor, the memory containing instructions, that when executed by the processor, perform the steps of: obtaining a plurality of video frames of a crowd scene; estimating a total number of people contained within at least one frame of the plurality of video frames; determining a subset of the total number of people as a group of tracker candidates, wherein the group of tracker candidates are located near a first end of a first video frame from the plurality of video frames; monitoring movement of the group of tracker candidates throughout the plurality of video frames; and in response to the group of tracker candidates reaching a second end of a second video frame from the plurality of video frames, computing an estimated crowd flow rate for the total number of people.

In yet another embodiment, there is provided a computer program product for an electronic communication device comprising a computer readable storage medium having program instructions embodied therewith, the program instructions executable by a processor to cause the electronic communication device to perform the steps of: obtaining a plurality of video frames of a crowd scene; estimating a total number of people contained within at least one frame of the plurality of video frames; determining a subset of the total number of people as a group of tracker candidates, wherein the group of tracker candidates are located near a first end of a first video frame from the plurality of video frames; monitoring movement of the group of tracker candidates throughout the plurality of video frames; and in response to the group of tracker candidates reaching a second end of a second video frame from the plurality of video frames, computing an estimated crowd flow rate for the total number of people.

BRIEF DESCRIPTION OF THE DRAWINGS

Features of the disclosed embodiments will be more readily understood from the following detailed description of the various aspects of the invention taken in conjunction with the accompanying drawings.

Figure 1A:
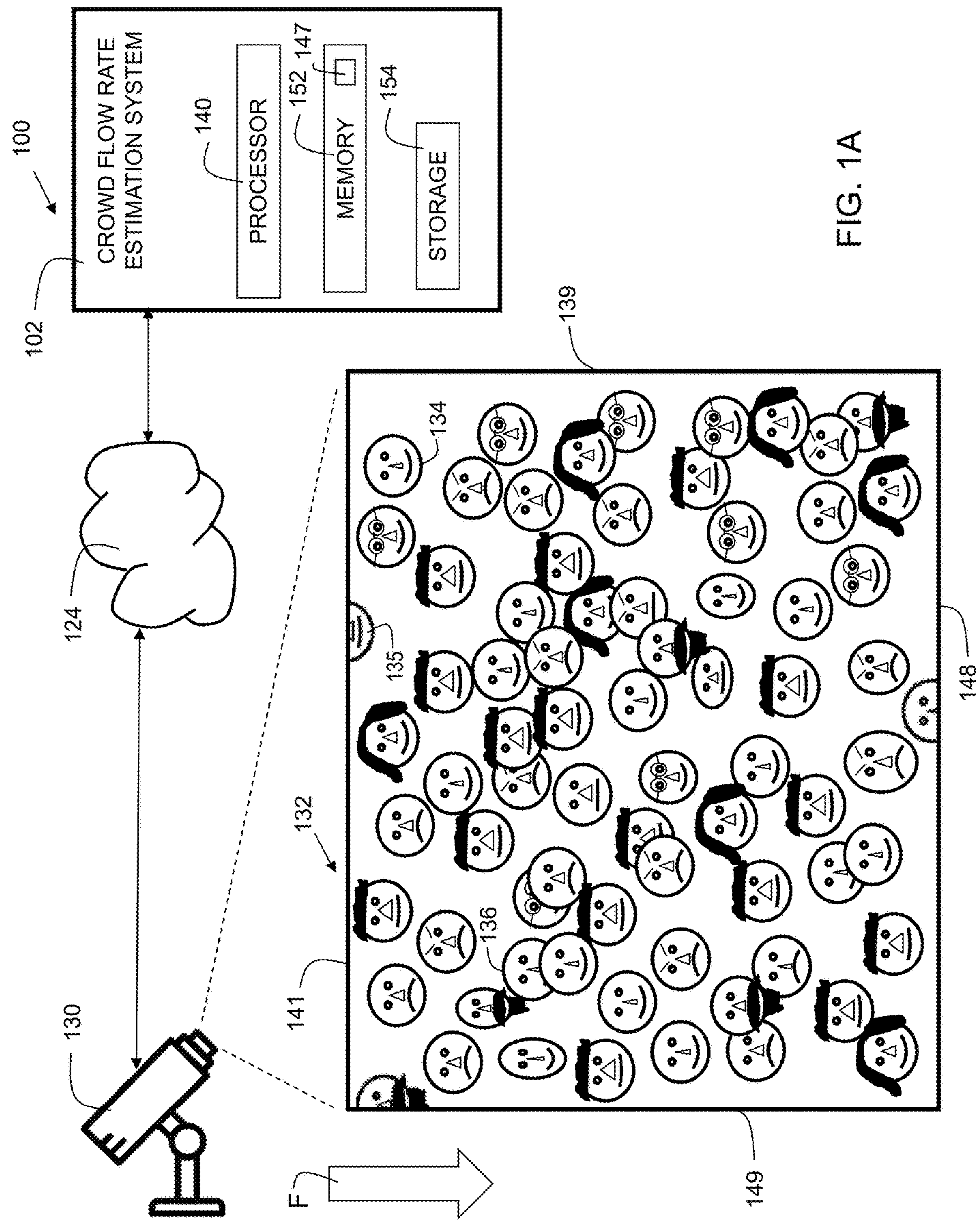
FIG. 1A is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for estimating crowd flow rate. Video frames are obtained from a crowd scene. Groups of consecutive video frames form a time window. Crowd flow rate through the field of view of the camera is analyzed by estimating a total number of people contained within at least one frame of a time window. A subset of the people within the frame are identified as a group of tracker candidates. The tracker candidates are monitored throughout the time window, and the time when the tracker candidates exit the field of view of the camera is used to estimate a crowd flow rate for the number of people passing through the field of view of the camera in a given time interval.

Understanding crowd flow, density and direction in crowd scenarios allows organizations to gain business intelligence and insight. Venues such as public parks, shopping centers, sports arenas, concert arenas, theme parks, and other public attractions often have very large crowds. It is therefore of great value to understand crowd flow rate for businesses, as it allows them to optimize crowd flow within a venue for safety, convenience, and retail purposes.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1A is an environment for embodiments of the present invention. Crowd flow rate estimation system 102 includes a processor 140, memory 152, and storage 154. Memory 152 stores instructions 147, which when executed by the processor, cause system 102 to implement embodiments of the present invention. Memory 152 may include dynamic random-access memory (DRAM), static random-access memory (SRAM), magnetic storage, and/or a read only memory such as flash, EEPROM, optical storage, or other suitable memory. In some embodiments, the memory 152 may not be a transitory signal per se. The storage 154 may include one or more hard disks, or other suitable storage technology. System 102 is an An electronic communication device. System 102 is connected to network 124. Network 124 is the Internet, a wide area network, local area network, or other suitable network. Also connected to network 124 is camera 130.

The camera's frame field of view (FOV) is represented at 132 with four edges, 139, 141, 148, and 149. As can be seen in the FOV 132, there is a crowd of people who are moving (e.g., walking) around the area being monitored by the camera. A general person is pointed out at 134. This person is unobscured and completely within the FOV. A partially obscured person is pointed out at 136. The partially obscured person 136 is blocked in part by another person. In embodiments, a partially obscured person can be blocked by another person, an object, a wall, door, etc. A person who is partially out of the FOV is pointed out at 135. Only the bottom portion of the face of person 135 is visible in the FOV because the top portion is outside of the FOV.

In the example, arrow F represents the flow measurement direction. This is the direction in which the people in the FOV are moving. In practice, there can be more than one flow measurement direction as people may not all be moving in the same direction. For example, if a concert just finished, people will, for the most part, be moving to the exit. If, instead, the venue is a mall, people may be heading in a variety of directions to visit different stores. In embodiments, crowd flow rate may be tracked in more than one direction. For example, people can be measured going "down" "left," "right," "up," "forward," "back," "north", "east", "south," "west," "northeast," "southwest," etc.

Figure 1B:
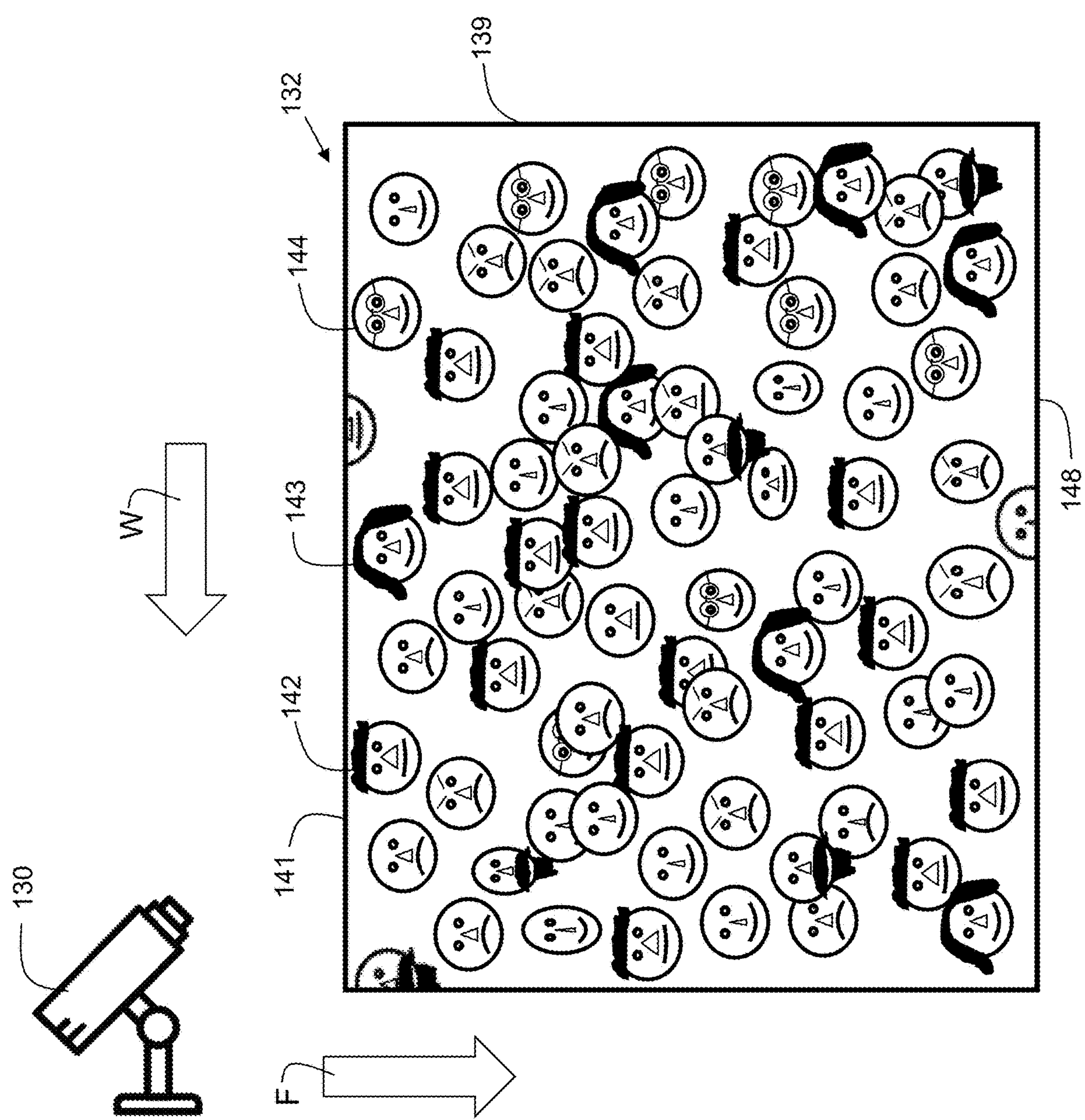
FIG. 1B shows an example of a group of tracker candidates at a tracking initiation edge.

FIG. 1B shows an example of a frame including a group of tracker candidates at a tracking initiation edge 141. The FOV of camera 130 is represented as box 132 having edges including edges 139 and 141. There is a crowd of tracker candidates (i.e. people) in the FOV 132. A subset of the total number of people is selected for tracking. In some embodiments, the subset of the total number of people for the group of tracker candidates ranges from two to ten people.

In the example, three people 142, 143, and 144 are identified for tracking. For direction F, the tracking initiation edge (i.e. entry) is edge 141 of the FOV 132 of camera 130. The tracker candidates are people having just entered the FOV 132 from top edge 141. When the tracker candidates enter the FOV 132, the time is recorded, and a time window is opened. The movement of the tracked people will be monitored as they travel through the FOV 132.

For direction W, the tracking initiation edge is right side edge 139 of the FOV 132 of camera 130. Arrow W represents a direction different from the direction of arrow F. If people were to be tracked in direction W, then the tracking initiation edge would be edge 139. Accordingly, the time window would open when the tracker candidates enter the FOV 132 at edge 139. Tracking in both directions (F and W) can be implemented simultaneously if desired.

Figure 1C:
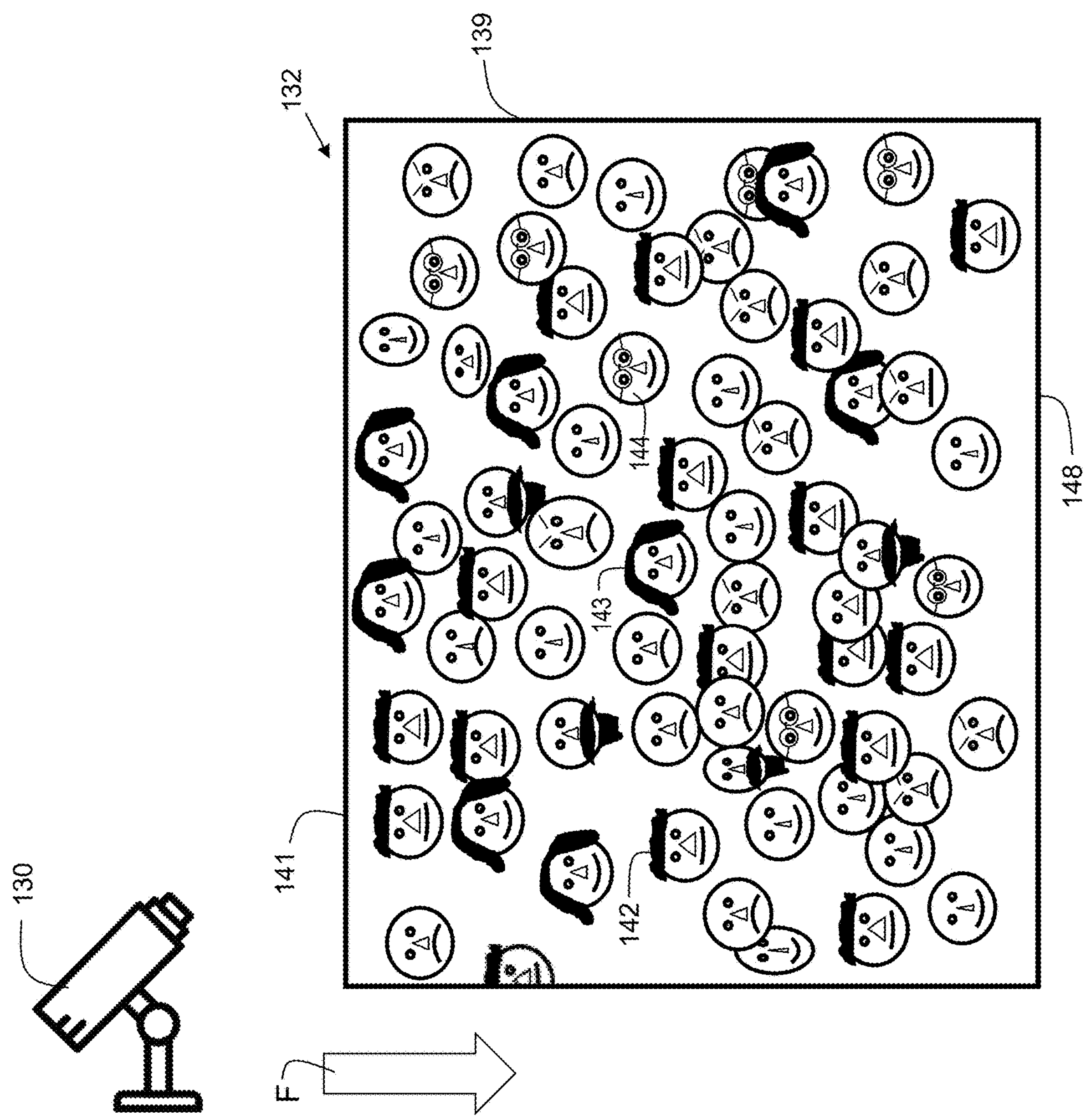
FIG. 1C shows an example of a group of tracker candidates progressing through a camera field of view.

FIG. 1C shows an example of a frame including a group of tracker candidates progressing through a camera field of view 132. The tracker candidates are moving through the FOV 132, and are now about halfway down from edge 141 in direction F. Accordingly, they have made progress in their movement since the time of image capture shown in FIG. 1B. They continue to be tracked.

Figure 1D:
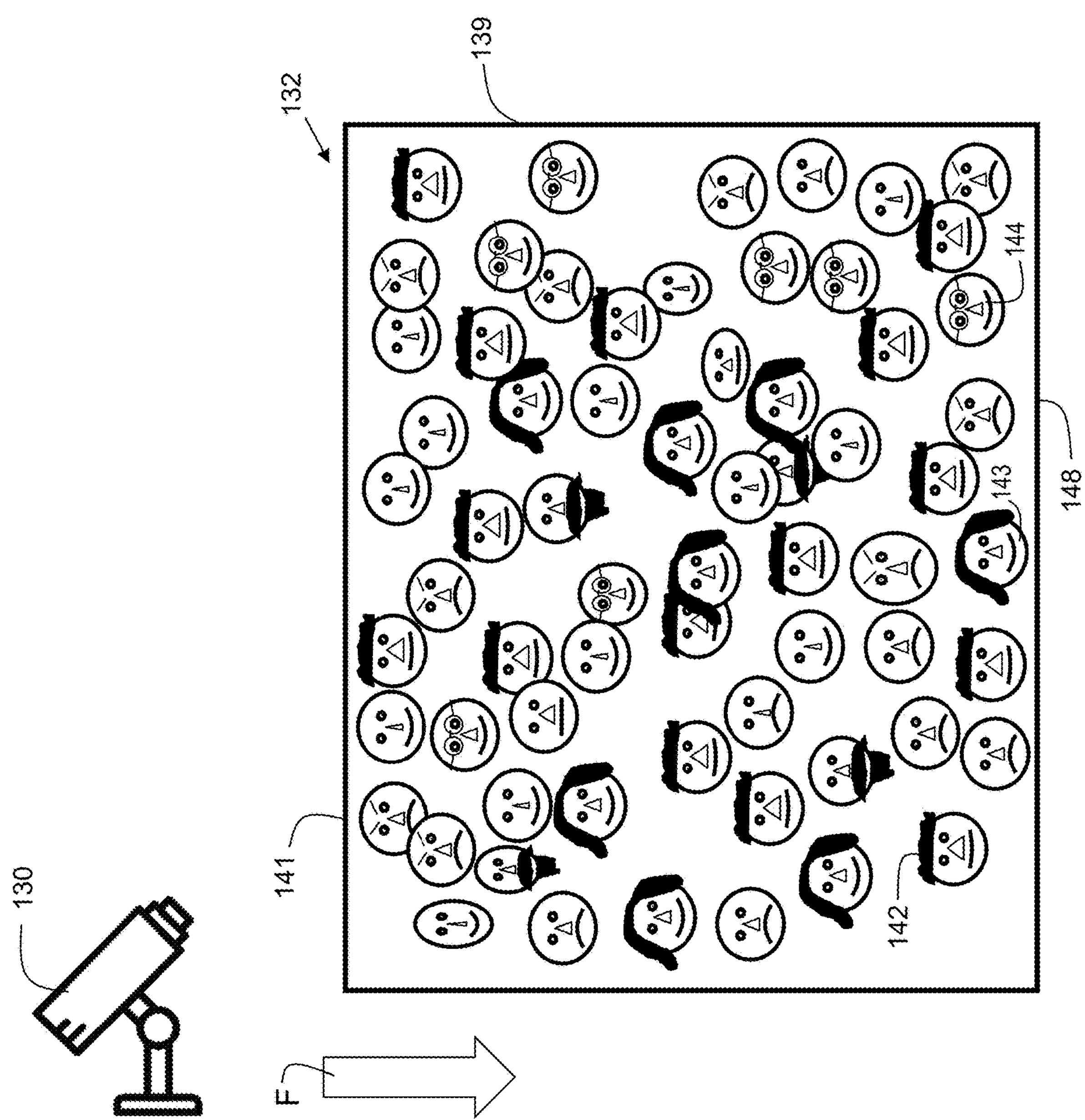
FIG. 1D shows an example of a group of tracker candidates near the end of a camera field of view.

FIG. 1D shows an example of a frame including group of tracker candidates near the end of a camera field of view 132. The tracker candidates have made further progress since the image capture shown in FIG. 1C. The tracker candidates continue to move until they exit the FOV 132 at exit edge 148. The time of the group exiting the FOV 132 is recorded, closing the time window.

The time window is a group of frames recorded by camera 130. An average speed of the group can be determined from distance and time as determined from analysis of the frames of the time window. The distance is the distance traversed between the tracking initiation edge 141 (edge of entry) and the exit edge 148. The time required for the tracker candidates to traverse the frame can be determined based on the time between the frame of entry and the frame of exit.

The group of tracker candidates travel from one edge to another in the track flow direction. The distance covered by the FOV, divided by the time required for the tracker candidates to traverse the frame, enables a calculation to derive an estimated speed of the group of tracker candidates. Using a single frame (i.e., the "snapshot" frame), it can be estimated how many total people are in the area captured by the frames in general by using standard facial recognition techniques. Then, it can be estimated, based on average number of people detected in the given frame, about how many people passed through the FOV in a given period of time, and from that, the crowd flow rate can be deduced. The crowd flow rate can be in units of people per time window, and can be normalized to people per minute. In some embodiments, a scaling factor may be applied to the total number of people. As an example, if there are, on average, 50 people in the frames, and the scaling factor is 0.9, then it is assumed that 90% of the people, 45 people, are travelling in substantially the same direction as the tracker candidates. By determining the speed of the tracker candidates, a crowd flow estimation can be derived. Continuing with the example, if the FOV distance is 30 meters, and the tracker candidates traverse the FOV in 18 seconds, then, using the scaling factor, it is estimated that 50*0.9=45 people traverse the FOV every 18 seconds. Converting to people per minute, it is then estimated that 45*60/18=150 people per minute are traversing the FOV area.

In another example, it takes 10 seconds for the group to cross the FOV 132 from edge 141 to edge 148. Based on the "snapshot" frame, it is estimated that there are 100 people in the frame. Accordingly, it can be estimated that roughly 100 people will pass through the frame in 10 seconds. There is a margin of error since some people aren't going in the direction measured. The margin can be, for instance, 10%. Accordingly, it can be determined that roughly 90-110 people walk through in 10 seconds. That means that approximately 540-600 people pass through the FOV area per minute. Thus, embodiments include, in response to the group of tracker candidates reaching a second end of a second video frame from the plurality of video frames, computing an estimated crowd flow rate for the total number of people.

Figure 1E:
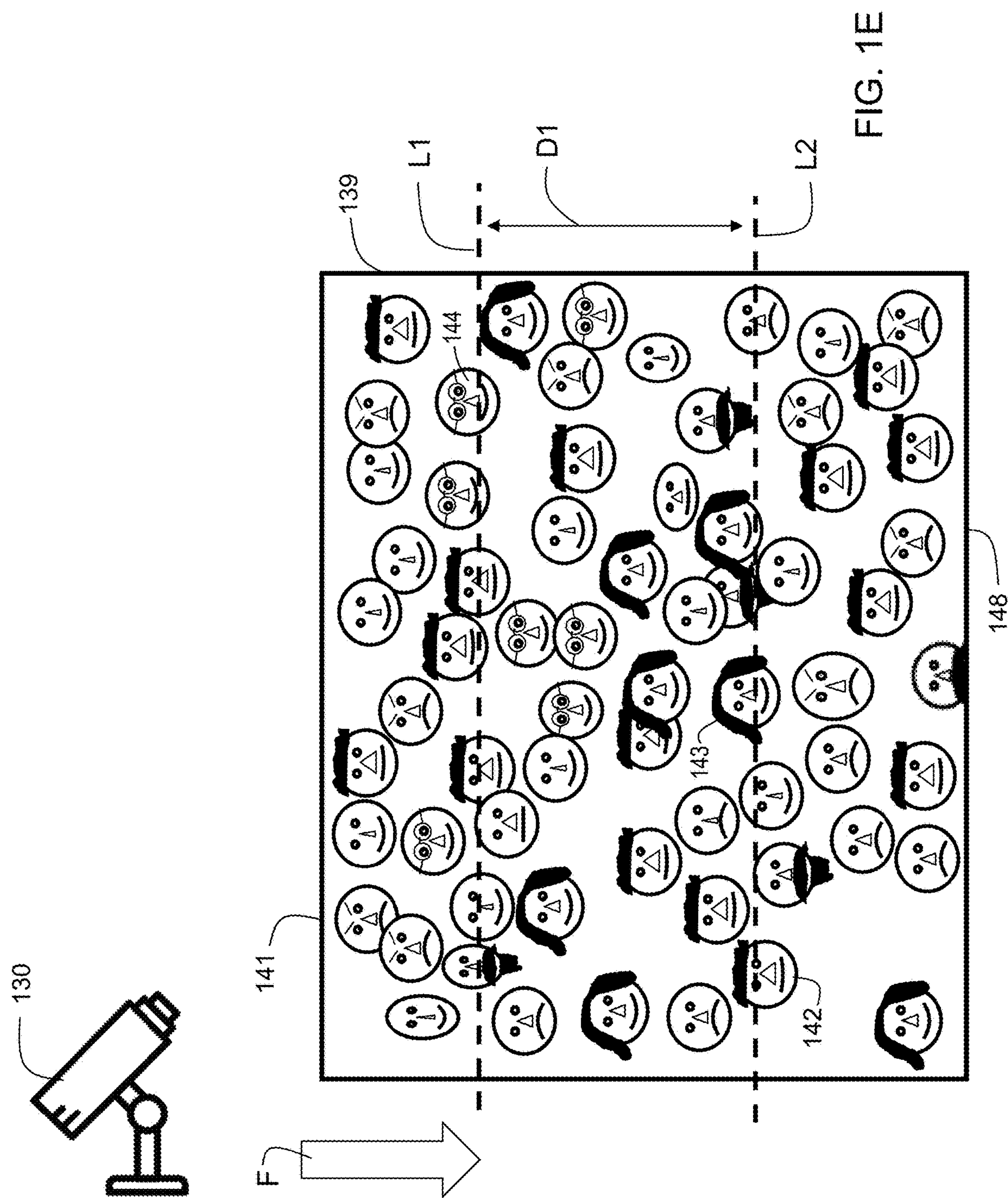
FIG. 1E shows an example of a decoupled tracker candidate.

FIG. 1E shows an example of a frame including a decoupled tracker candidate. In some cases, a group will become fragmented if a person in the original group of tracker candidates decouples from the group. In embodiments, an imaginary line is created, e.g., L2, that tracks the approximate position of the group in the F direction. Person 144 is lagging behind at a position on another imaginary line, L1. The distance, D1, between L1 and L2 is large enough (in terms of total FOV, or absolute distance) that embodiments discard person 144 from the group in terms of judging flow rate. Person 144 is said to be "decoupled" from the tracking group. In embodiments, when the distance, D1, is above a threshold, the discarding is performed. The remainder of the people in the group are used for the estimation.

Figure 1F:
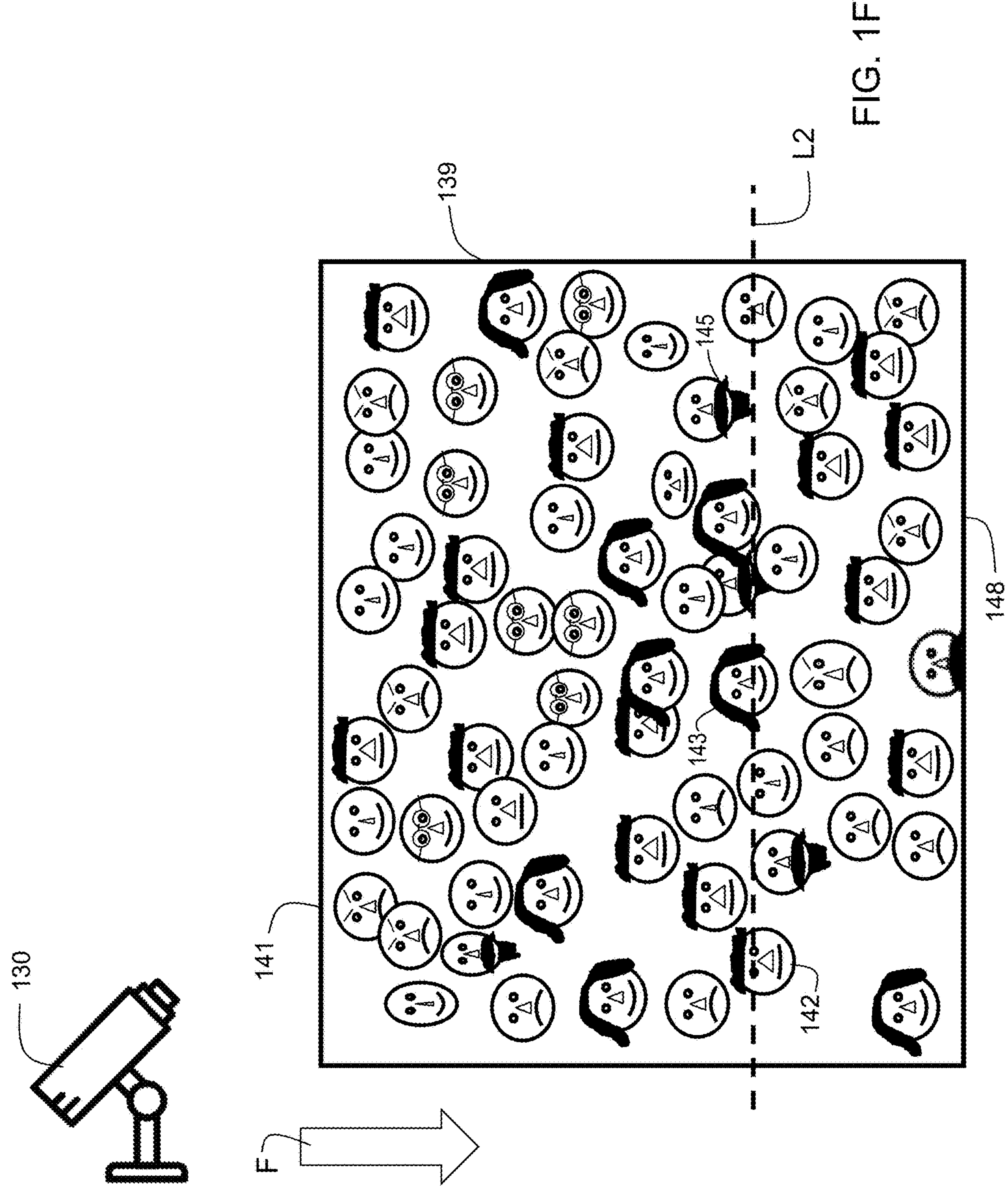
FIG. 1F shows an example of acquiring an alternate tracker candidate.

FIG. 1F shows an example of acquiring an alternate tracker candidate. Embodiments can include, in response to at least one tracker candidate from the group of tracker candidates decoupling from the group of tracker candidates, obtaining an alternate tracking candidate. In some embodiments, when a person has been decoupled, an alternate person can be added to the remainder of the group. A person in the close vicinity of imaginary line L2 (where the remainder of the group is currently located) is selected. The alternate person may be randomly selected based on proximity to the imaginary line L2. Person 145 is substituted for the decoupled person and will be tracked with the rest of the group as they traverse the FOV 132 toward edge 148.

Figure 1G:
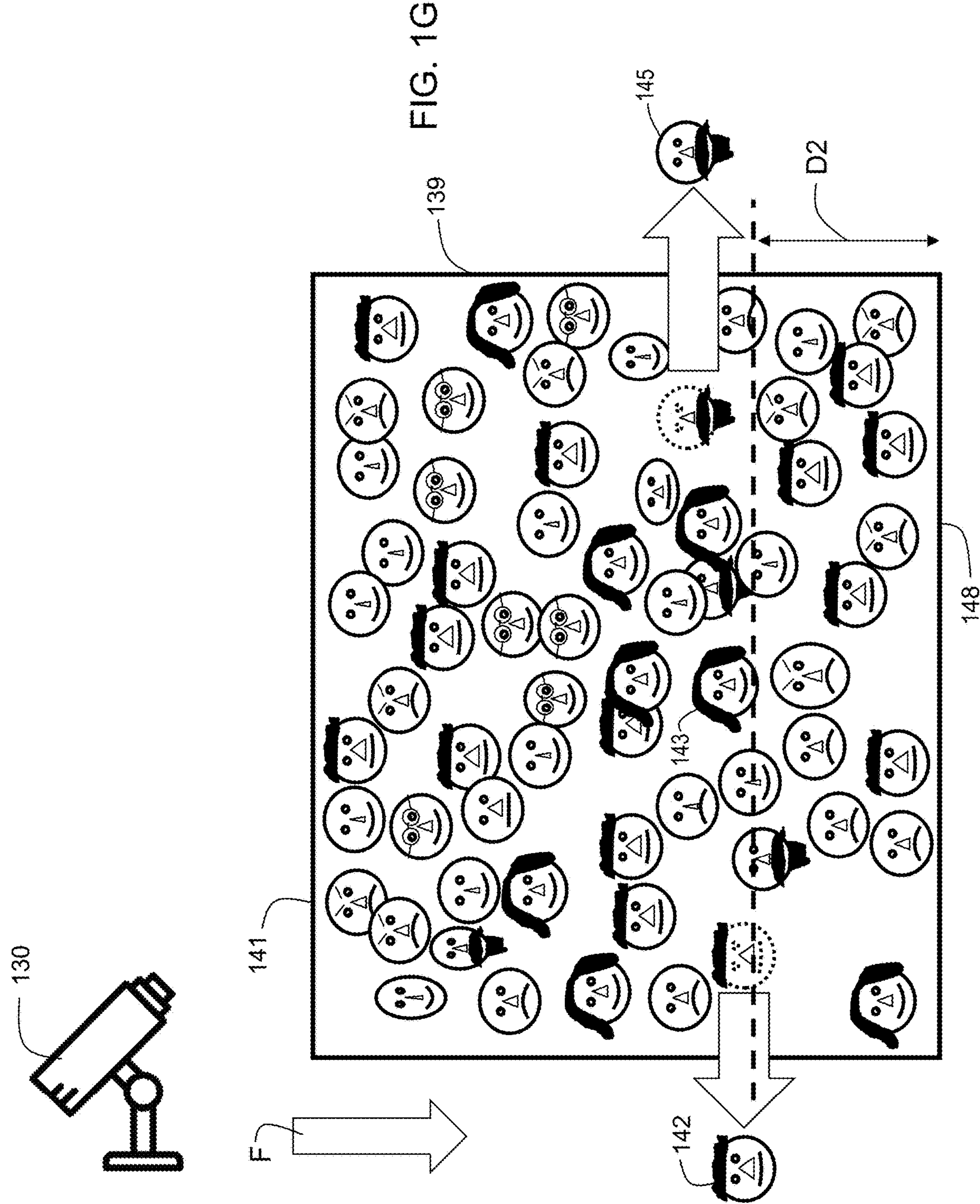
FIG. 1G shows an example of conditions for discarding a time window.

FIG. 1G shows example conditions for discarding a time window. In some cases, a fragmented group occurs when the people start walking in the wrong direction (a direction other than the flow measurement direction) out of the FOV. In the example, person 142 walks to the left, and person 145 walks to the right. Person 143 is the only tracked person still traveling in the flow measurement direction. Accordingly, in the example, there is only one person left, and distance D2 to the end edge 148 of the FOV 132 is too short to obtain new candidates. Therefore, no alternate candidates are available, so the time window (group of frames) is discarded and the process is started over. If after a (preset) threshold number of attempts, there is not success in tracking a group of tracker candidates from one edge to another edge, the crowd flow can be deemed as unorganized (not flowing in any one particular direction).

Figure 1H:
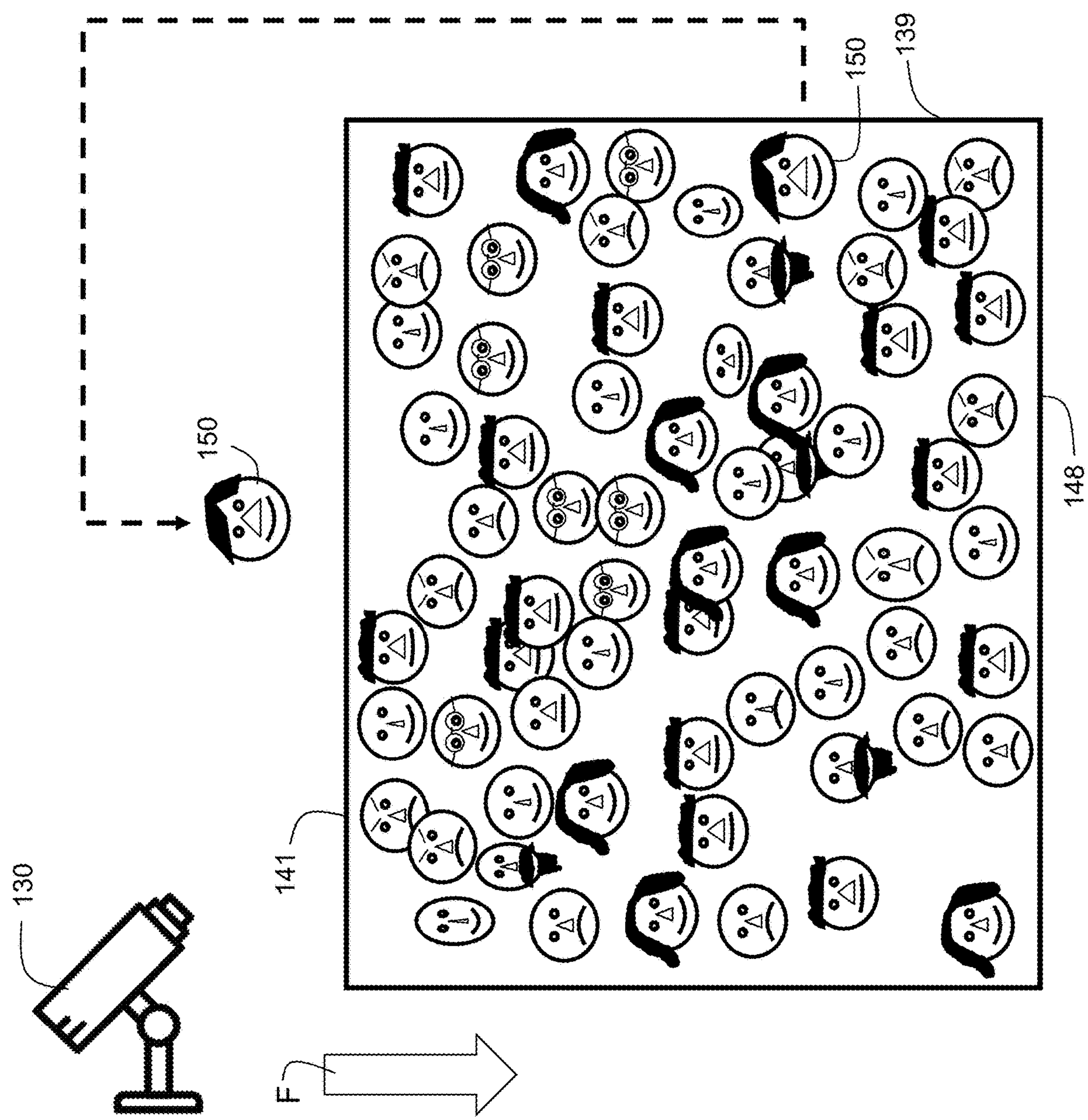
FIG. 1H shows an example of identifying doublebackers for computation of a unique individual flow rate.

FIG. 1H shows an example of identifying doublebackers for computation of a unique individual flow rate. Embodiments may further include detecting a first appearance of a specific person in the crowd scene. A second appearance of the specific person is then detected in the crowd scene. The second appearance is a predetermined return duration from the first appearance. In embodiments, the predetermined return duration ranges from 30 seconds to 300 seconds. The specific person is removed from the estimated crowd flow rate to derive a unique individual flow rate (UIFR). This is performed so as to refrain from counting this person twice. The UFIR is the number of different (unique) people that passed through the FOV. Accordingly, doublebackers should not be counted twice. Here, in the example, person 150 left the FOV and returned. Since it is recognized that he was just here, his second appearance in the FOV is not counted in the UIFR.

Person 150, even though he is a doublebacker, is counted on both the first and second pass for computation of the total flow rate (TFR). The total flow rate is the amount of total people that pass through. Accordingly, the TFR includes doublebackers (those who enter the same FOV multiple times).

Figure 2:
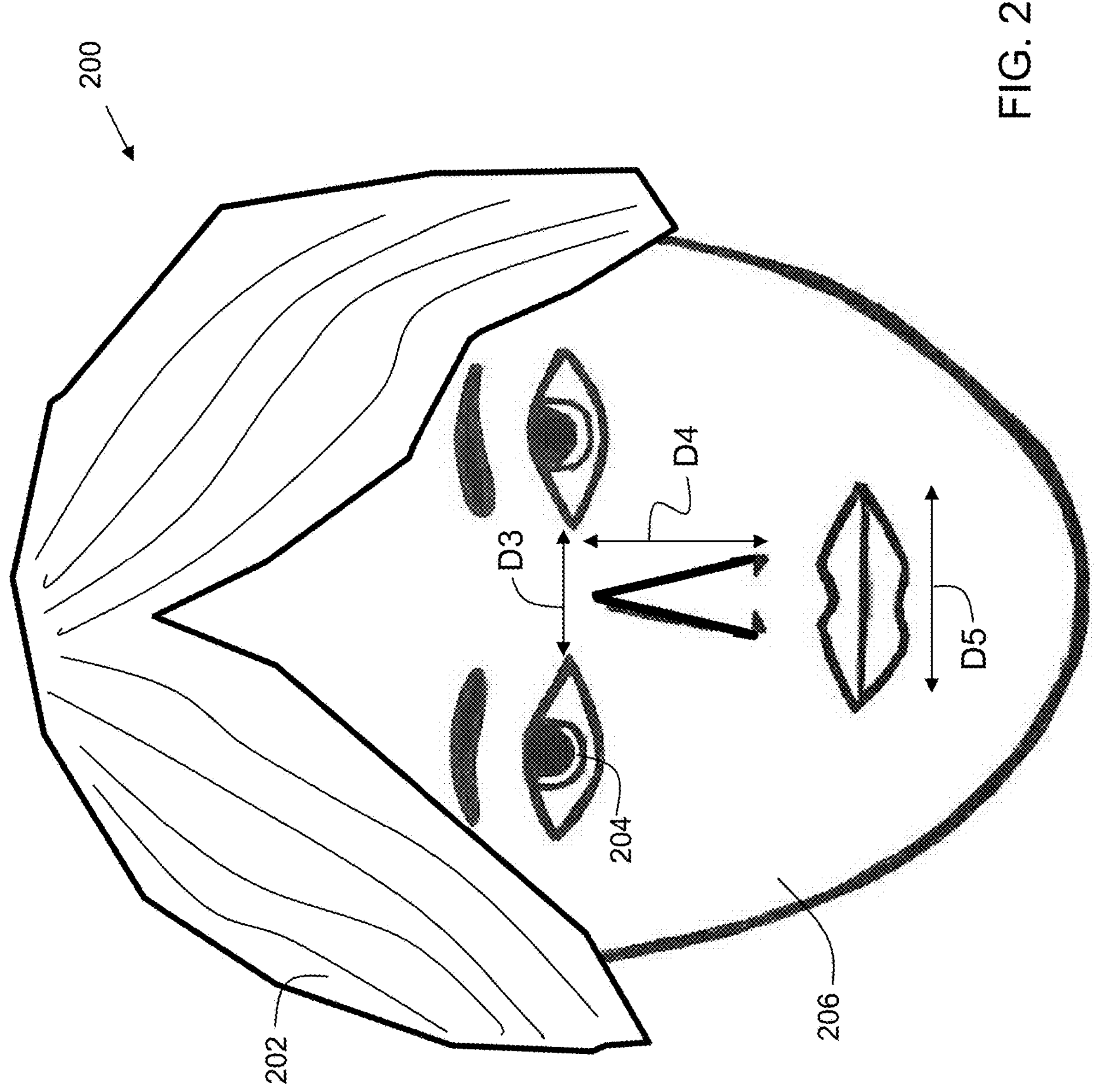
FIG. 2 shows examples of facial parameters used for facial recognition in the identification of doublebackers.

FIG. 2 shows a face 200, illustrating examples of facial parameters used for facial recognition in the determination of unique facial characteristics. In embodiments, the unique facial characteristics can be used to identify doublebackers. Facial recognition can use various facial parameters to estimate whether the same person returns into the FOV. A plurality of facial parameters can be obtained from the specific person. The facial parameters of the specific person are recorded. The facial parameters of one or more people entering a FOV having a crowd scene are compared to the stored facial parameters of the specific person. A second appearance of the specific person is indicated in response to a correlation exceeding a predetermined score.

In embodiments, obtaining a plurality of facial parameters includes analyzing and measuring features of a face. In some embodiments, it includes obtaining an eye spacing parameter D3, a nose length parameter D4, or a mouth width parameter D5. These may be measured in millimeters, inches, or other suitable measurement. In embodiments, obtaining a plurality of facial parameters includes obtaining a hair color parameter 202, an eye color parameter 204, or a skin tone parameter 206, each of which may be measured using color analysis. These are example measurements and analyses, and any suitable measurements and analyses can be substituted within the scope of the invention.

In the example, a formula is used to determine the likelihood of the face in the FOV. The formula is:

$$\text{Score } S=\text{ABS}(X+Y+Z+C)\text{, where:}$$

X is the absolute difference of eye distance D3 between the currently identified face and a previously stored face Y is the absolute difference of mouth width D5 between the currently identified face and a previously stored face Z is the absolute difference of nose length D4 between the currently identified face and a previously stored face C is the absolute difference of eye color (an RGB value) between the currently identified face and a previously stored face The lower the score, the closer the match. It should be recognized that this is an example formula, and that any suitable formula can be substituted within the scope of the invention.

Figure 3:
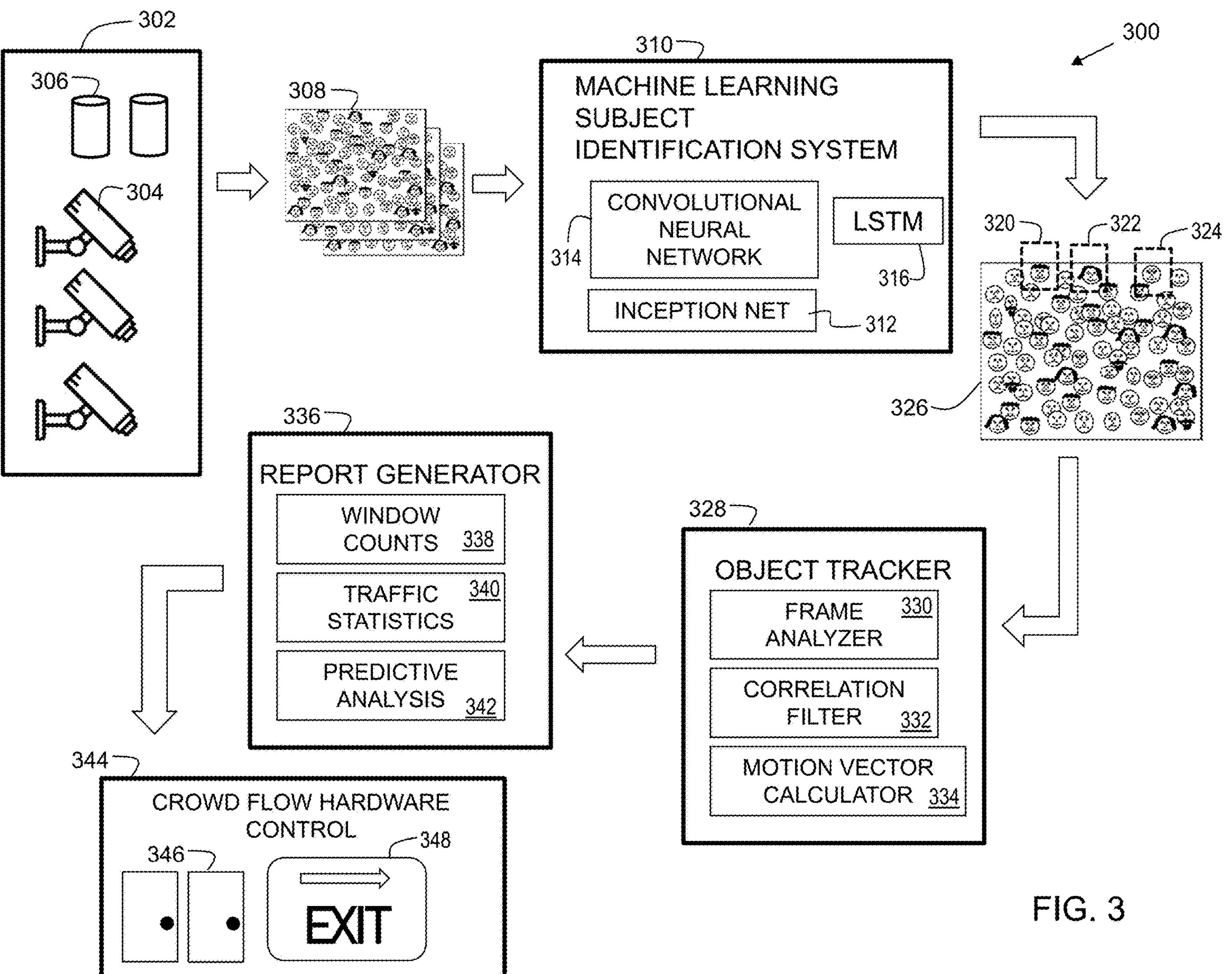
FIG. 3 is a block diagram of a system in accordance with embodiments of the present invention.

FIG. 3 is a block diagram 300 of a system in accordance with embodiments of the present invention. At block 302, there are video sources. This can be cameras 304 to capture live feed/footage. At 306, there is previously recorded footage from a disk. The previously recorded footage can be used to analyze past events. For example, if there was a melee, later the police can try to make determinations about how many people were there or passed through the vicinity by using data stored on disk. At 308, there are time window frames captured from the cameras or extracted from the disks.

At 310, there is a machine learning subject identification system to identify human faces. In some embodiments, this may include one or more of inception network 312, convolutional neural network 314, or long-short-term memory (LSTM) 316. These components are techniques and hardware for machine learning and detection from observational data. System 310 identifies tracker candidates. At 326, there is shown a representation of frames with candidates identified 320, 322, and 324 identified.

At 328, there is an object tracker, which analyzes video frames to determine whether identified candidates are moving together, in same direction, etc. Object tracker 328 may include a frame analyzer 330, correlation filter 332, and a motion vector calculator 334. Frame analyzer 330 processes the frames. Correlation filter 332 performs mathematical functions to identify new position of tracker candidates in subsequent frames. Motion vector calculator 334 may encode movement as a vector with magnitude and direction, to enable mathematical comparison of the movement of each tracker candidate to confirm if tracker candidates are coupled (i.e., moving at substantially the same rate and direction).

At 336, there is a report generator. The report generator may include window counts 338 (number of frames in a time window), traffic statistics 340 (estimated flow rate over time), and predictive analysis 342. Predictive analysis is performed based on trends to predict future flow rate (e.g., Saturdays at 9:00 p.m. tend to be busy, so predict heavy crowds and slow crowd flow for next Saturday).

At 344, there is crowd flow hardware control. This may be an electronic door, an electronic lock, an electronic window, an electronic wall, an electronic sign, or other suitable item. For example, a message may be sent to the electronic sign to light up when flow is heavy, directing people in a particular direction.

Figure 4:
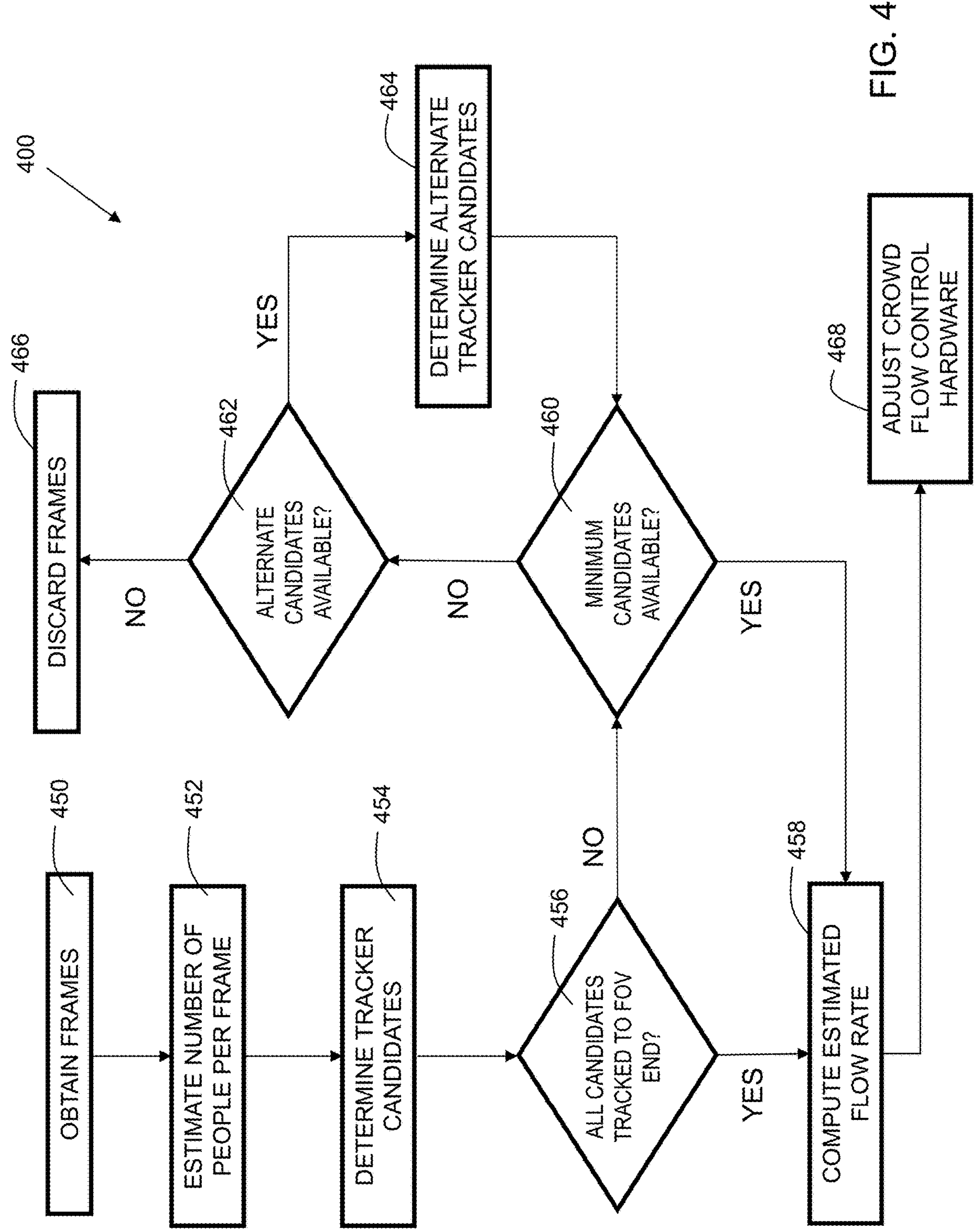
FIG. 4 is a flowchart showing process steps for embodiments of the present invention.

FIG. 4 is a flowchart 400 showing process steps for embodiments of the present invention. At block 450, frames are obtained. At block 452, a number of people per frame is estimated (from a "snapshot" frame). At block 454, tracker candidates are determined. At block 456, it is determined whether all candidates are tracked to the end of the field of view. If yes, estimated flow rate is computed at block 458, and crowd flow control hardware is adjusted at block 468.

If no at 456, at block 460, it is determined whether the minimum number of candidates are available. If yes, the process proceeds to block 458 where the estimated flow rate is computed. If no at block 460, at block 462, it is determined whether alternate candidates are available. If no, the frames are discarded at block 466. If yes at block 462, at block 464, the alternate tracker candidates are determined, and the process proceeds back to block 460.

Embodiments can include, in response to at least one tracker candidate from the group of tracker candidates decoupling from the group of tracker candidates, discarding the plurality of video frames for the computing an estimated flow rate for the total number of people. Embodiments can include, in response to computing an estimated crowd flow rate below a minimum threshold, adjusting crowd flow control hardware. Crowd flow control hardware includes, for example, electronic doors, electronic wall-like barriers, windows (for air flow), etc. A message may be sent from system 102 (FIG. 1) to open more electronic exit doors upon computing a significant increase in flow of people (e.g., in an expo center after a concert).

Figure 5:
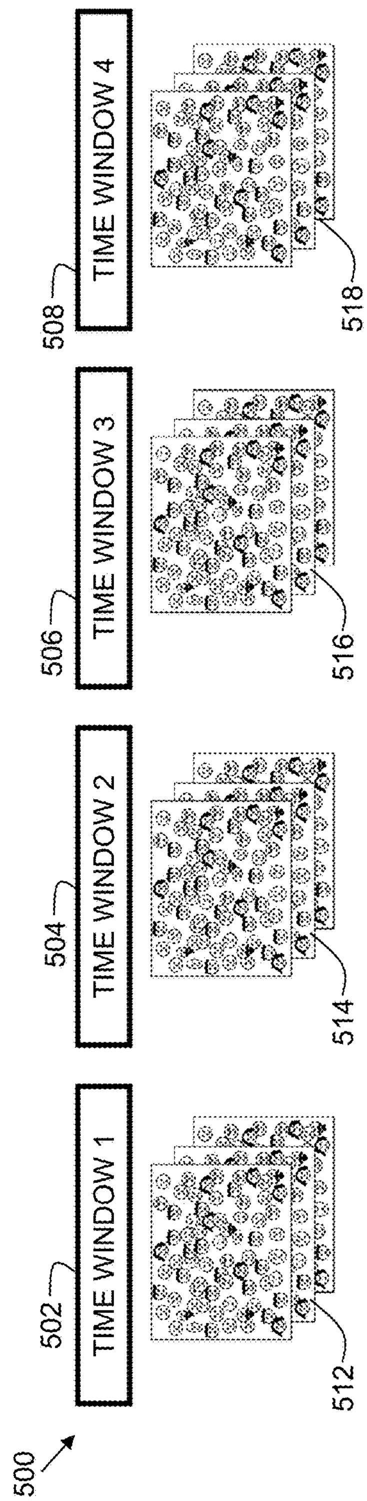
FIG. 5 shows the relationship between time windows and video frames.

FIG. 5 shows the relationship between time windows and video frames. Time windows are groups of frames. Each time window may, in some embodiments, be 30 seconds to 5 min, and can have groups of frames, even hundreds of frames. Tracking is initiated at the beginning of a time window, and ceased at the end of a time window. In the example, there are four time windows. At Time Window 1 502, there is a set of frames 512. At Time Window 504, there is a set of frames 514. At Time Window 3 506, there is a set of frames 516. At Time Window 4 508, there is a set of frames 518. The process of embodiments is repeated for each time window to monitor flow over time.

Figure 6:
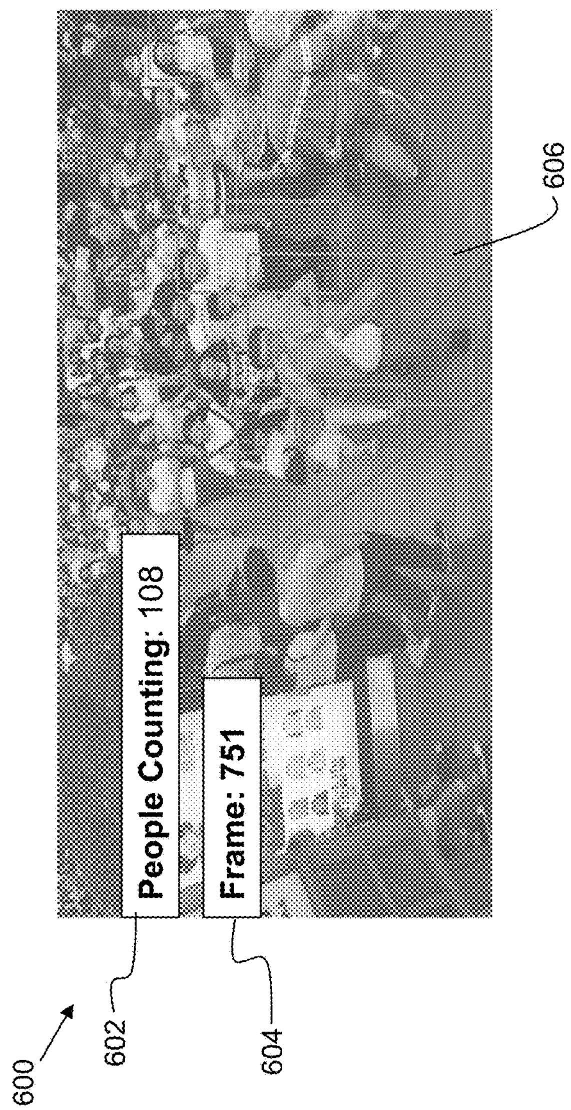
FIG. 6 shows an example of a video frame in accordance with embodiments of the present invention.

FIG. 6 shows an example of a video frame 600 in accordance with embodiments of the present invention. At 604, there is a frame number for the frame within the time window. A crowd of people are walking. Examples of people are surrounded by boxes, an example of which is pointed out at 606. At 602, there is an estimation of the number of people to have traversed the field of view (FOV) so far in the time window.

As can now be appreciated, disclosed embodiments provide techniques estimating crowd flow rate. Video frames are obtained from a crowd scene. Groups of consecutive video frames form a time window. Crowd flow rate through the field of view of the camera is analyzed by estimating a total number of people contained within at least one frame of a time window. A subset of the people within the frame are identified as a group of tracker candidates. The tracker candidates are monitored throughout the time window, and the time when the tracker candidates exit the field of view of the camera is used to estimate a crowd flow rate for the number of people passing through the field of view of the camera in a given time interval. Understanding crowd flow within a venue provides for greater safety, convenience, and retail opportunities. Furthermore, in some embodiments, crowd flow rate information can be directly coupled to crowd flow control hardware such as gates, doors, and/or signage to dynamically adjust to crowd conditions. Thus, disclosed embodiments can improve the technical field of crowd flow rate estimation.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for crowd flow rate estimation, comprising:

obtaining a plurality of video frames of a crowd scene;

estimating a total number of people contained within at least one frame of the plurality of video frames;

determining a subset of the total number of people as a group of tracker candidates, wherein the group of tracker candidates are located near a first end of a first video frame from the plurality of video frames;

monitoring movement of the group of tracker candidates throughout the plurality of video frames;

in response to the group of tracker candidates reaching a second end of a second video frame from the plurality of video frames, computing an estimated crowd flow rate for the total number of people;

detecting a first appearance of a specific person in the crowd scene;

detecting a second appearance of the specific person in the crowd scene, wherein the second appearance is a predetermined return duration from the first appearance; and removing the specific person from the estimated crowd flow rate to derive a unique individual flow rate.

2. The method of claim 1, further comprising, in response to at least one tracker candidate from the group of tracker candidates decoupling from the group of tracker candidates, obtaining an alternate tracking candidate.

3. The method of claim 1, further comprising, in response to at least one tracker candidate from the group of tracker candidates decoupling from the group of tracker candidates, discarding the plurality of video frames for the computing an estimated crowd flow rate for the total number of people.

4. The method of claim 1, wherein the subset of the total number of people for the group of tracker candidates ranges from two to ten people.

5. The method of claim 1, wherein the return duration ranges from 30 seconds to 300 seconds.

6. The method of claim 1, wherein detecting a second appearance of a specific person comprises:

obtaining a plurality of facial parameters from the specific person;

recording the plurality of facial parameters of the specific person; and comparing a plurality of facial parameters of one or more people entering a crowd scene to the plurality of facial parameters of the specific person, and indicating a second appearance of the specific person in response to a correlation exceeding a predetermined score.

7. The method of claim 6, wherein obtaining a plurality of facial parameters includes obtaining an eye spacing parameter.

8. The method of claim 6, wherein obtaining a plurality of facial parameters includes obtaining an eye color parameter.

9. The method of claim 6, wherein obtaining a plurality of facial parameters includes obtaining a hair color parameter.

10. The method of claim 6, wherein obtaining a plurality of facial parameters includes obtaining a nose length parameter.

11. The method of claim 1, further comprising, in response to computing an estimated crowd flow rate below a minimum threshold, adjusting crowd flow control hardware.

12. An electronic communication device comprising:

a processor;

a memory coupled to the processor, the memory containing instructions, that when executed by the processor, perform the steps of:

obtaining a plurality of video frames of a crowd scene;

estimating a total number of people contained within at least one frame of the plurality of video frames;

determining a subset of the total number of people as a group of tracker candidates, wherein the group of tracker candidates are located near a first end of a first video frame from the plurality of video frames;

monitoring movement of the group of tracker candidates throughout the plurality of video frames;

in response to the group of tracker candidates reaching a second end of a second video frame from the plurality of video frames, computing an estimated crowd flow rate for the total number of people;

detect a first appearance of a specific person in the crowd scene;

detect a second appearance of the specific person in the crowd scene, wherein the second appearance is a predetermined return duration from the first appearance; and remove the specific person from the estimated crowd flow rate to derive a unique individual flow rate.

13. The electronic communication device of claim 12, wherein the memory further comprises instructions, that when executed by the processor, perform the step of, in response to at least one tracker candidate from the group of tracker candidates decoupling from the group of tracker candidates, obtaining an alternate tracking candidate.

14. The electronic communication device of claim 12, wherein the memory further comprises instructions, that when executed by the processor, perform the step of, in response to at least one tracker candidate from the group of tracker candidates decoupling from the group of tracker candidates, discarding the plurality of video frames for the computing an estimated crowd flow rate for the total number of people.

15. A computer program product for an electronic communication device comprising a computer readable storage medium having program instructions embodied therewith, the program instructions executable by a processor to cause the electronic communication device to perform the steps of:

obtaining a plurality of video frames of a crowd scene;

estimating a total number of people contained within at least one frame of the plurality of video frames;

determining a subset of the total number of people as a group of tracker candidates, wherein the group of tracker candidates are located near a first end of a first video frame from the plurality of video frames;

monitoring movement of the group of tracker candidates throughout the plurality of video frames;

in response to the group of tracker candidates reaching a second end of a second video frame from the plurality of video frames, computing an estimated crowd flow rate for the total number of people;

detecting a first appearance of a specific person in the crowd scene;

detecting a second appearance of the specific person in the crowd scene, wherein the second appearance is a predetermined return duration from the first appearance; and removing the specific person from the estimated crowd flow rate to derive a unique individual flow rate.

16. The computer program product of claim 15, wherein the computer readable storage medium includes program instructions executable by the processor to cause the electronic communication device to perform the step of, in response to at least one tracker candidate from the group of tracker candidates decoupling from the group of tracker candidates, obtaining an alternate tracking candidate.

17. The computer program product of claim 15, wherein the computer readable storage medium includes program instructions executable by the processor to cause the electronic communication device to perform the step of, in response to at least one tracker candidate from the group of tracker candidates decoupling from the group of tracker candidates, discarding the plurality of video frames for the computing an estimated crowd flow rate for the total number of people.

18. The computer program product of claim 15, wherein the computer readable storage medium includes program instructions executable by the processor to cause the electronic communication device to perform the step of, in response to computing an estimated crowd flow rate below a minimum threshold, adjusting crowd flow control hardware.

* * * * *